(No Model.)
J. H. CAMPBELL.
METHOD OF UTILIZING AQUA AMMONIA IN ENGINES.
No. 346,425. Patented July 27, 1886.
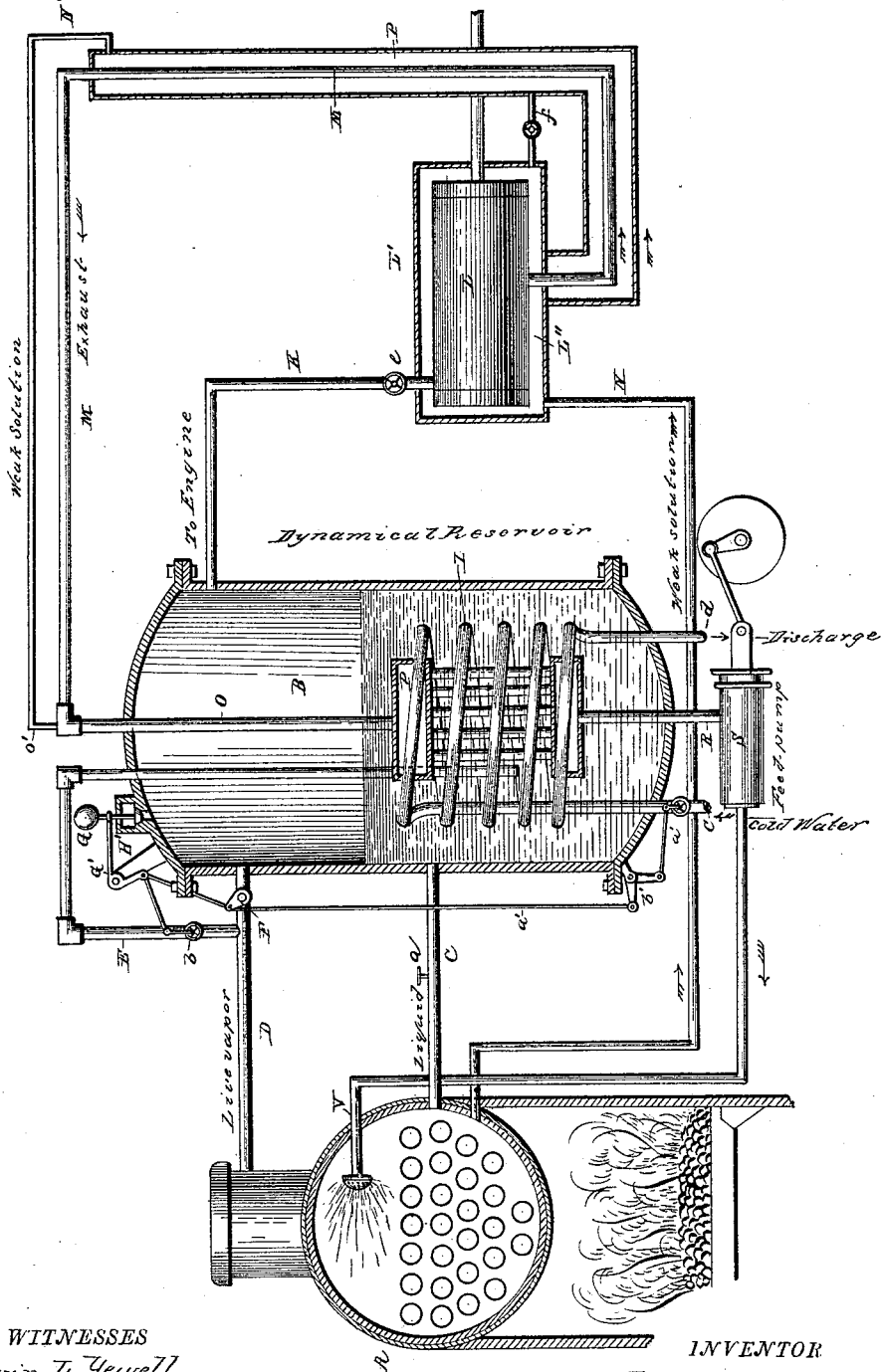
WITNESSES
Edwin L. Yewell,
F. T. Chapman
INVENTOR
Jos. H. Campbell
By
L. W. Ginsabaugh
Attorney

UNITED STATES PATENT OFFICE.

JOSEPH H. CAMPBELL, OF NEW YORK, N. Y.

METHOD OF UTILIZING AQUA-AMMONIA IN ENGINES.

SPECIFICATION forming part of Letters Patent No. 346,425, dated July 27, 1886.

Application filed November 5, 1885. Serial No. 181,967. (No model.)

*To all whom it may concern:*

Be it known that I, JOSEPH H. CAMPBELL, a citizen of the United States, residing at New York, in the county of New York and State of New York, have invented certain new and useful Improvements in Methods of Utilizing Aqua-Ammonia as a Motive Power in Engines, of which the following is a specification, reference being had therein to the accompanying drawing.

My invention relates to improvements in the application of aqua-ammonia as a motive power in engines, and more particularly to that class of engines shown, described, and claimed by me in an application filed on June 11, 1885, Serial No. 168,339.

The object of my invention is to utilize the heat of absorption to heat the liquid in the dynamical reservoir, to automatically control the temperature of the liquid in the reservoir, and to automatically control the tension of the vapor in both the boiler and dynamical reservoir.

A further object of my invention is to enable the operator to produce at will a strong solution in the reservoir and a weak solution in the boiler, by conveying the vapor from the boiler to the reservoir as either a kinetic or potential energy, and to confine the same in separate parts of the reservoir.

A further object of my invention is to maintain a proper working temperature in the body of the cylinder by means of a movable body of the hot weak solution from the boiler, and to utilize this body of weak solution after it has parted with a portion of its heat to absorb the exhaust-vapor from the cylinder, and then to spray the solution thus formed into the vapor-space of the boiler before it comes in contact with the body of the liquid therein.

My invention consists in the method of submerging the absorber in the liquid of the reservoir, in which the exhaust-vapor from the cylinder is absorbed by a cooled weak solution, so that the heat of absorption will be transmitted to the liquid which surrounds the absorber.

My invention consists, further, of the method of controlling the temperature of the solution in the dynamical reservoir by the automatic interposition of a cooling agent.

My invention consists, further, in the method of controlling the pressure of the vapor in both boiler and dynamical reservoir by automatically diverting the excess of kinetic energy not required for the engine and storing it in the solution within the dynamical reservoir.

My invention consists, further, in the method, hereinafter described, of producing a stronger solution in the dynamical reservoir than is contained in the boiler, by transferring the vapor from the boiler and introducing it below the surface of the liquid contained in the dynamical reservoir.

My invention consists, further, in the method, hereinafter described, of confining the vapor from the boiler in the dynamical reservoir as a kinetic or potential energy, and increasing or diminishing the space occupied by either, as occasion may require.

My invention consists, further, in the method, hereinafter described, of maintaining the proper working temperature of the cylinder by surrounding the same with a moving body of hot weak solution from the boiler.

My invention consists, further, in returning the cooled and saturated solution to the boiler in the form of a spray in the vapor-space of the boiler, whereby a large portion of the vapor will be liberated before it comes in contact with the liquid of the boiler.

In definition of the terms "kinetic" and "potential" energies as used in the foregoing, it may be proper to state here that the vapor which is transmitted from the boiler into the vapor-space of the dynamical reservoir and produces pressure to propel the piston of the engine is termed "kinetic," while the vapor which has been transmitted from the boiler into the liquid-space of the reservoir and been absorbed by the solution is termed "potential," for it is possible, by raising the temperature of the solution or by diminishing the pressure, to render it available for work.

It is a well-established fact that vapors in the condition of those in the upper part of the reservoir have three motions—viz., the motions of vibration, rotation, and translation; that about three-fifths of the heat required to produce these motions is consumed in producing the motion of translation. In my opinion the vapors, (or the molecules of the vapors) in the lower portion of the dynamical reservoir that are held in solution, have only two motions—those of vibration and rotation; that it is the arresting of the motion of translation when the vapor comes in contact with the absorbing solution that produces the heat of absorption. If these possess the motion of translation at all, their orbit is so circumscribed that the tension is too feeble to be measured by the ordinary pressure-gage. Therefore they are termed "potential" so long as they are held in solution.

In the drawing I have shown a side view, partly in section, of a plant or engine adapted to carry my methods into operation.

A indicates the boiler, which may be of any suitable construction; B, the dynamical reservoir, which is connected to the boiler by a regulating-pipe, C, provided with a suitable valve, $a$, for transferring the liquid from the boiler to the reservoir or from the reservoir to the boiler, to meet the requirements of pressure. The vapor-space of the boiler is connected to the vapor-space of the dynamical reservoir by means of the pipe D, through which the vapor or kinetic energy is transmitted from the boiler to the upper portion of the reservoir, where it is available to propel the piston of the engine.

E is a pipe connected to the pipe D at a point between the boiler and valve F in the pipe D. The pipe E is also provided with a valve between the pipe D and the reservoir. This pipe E enters the reservoir at the top and passes down through the vapor-space below the surface of the solution contained in the reservoir, where it discharges the vapor transmitted from the boiler, in order that it may be absorbed by the solution contained therein, and thus converted into potential energy. The valve $b$ in pipe E is termed the "potential" valve.

The pipe D is provided with a suitable valve, F, which I term the "kinetic" valve, said valve F being operated by a weighted valve, G, adapted to regulate the tension of the vapor in the dynamical reservoir directly, and indirectly to regulate it in the boiler. The kinetic valve F is connected to the bell-crank lever G', which is pivoted in the standard H', the other arm of the bell-crank lever being connected to the weighted valve G. The valve $b$ is also connected to the bell-crank lever, so than when the tension of the vapor in the dynamical reservoir becomes too great the valve G will be raised, the valve F in the pipe D will be automatically closed, and the valve $b$ in the pipe E will be opened, thus allowing the excess of vapor or the kinetic energy transmitted from the boiler to pass down into the solution in the dynamical reservoir, and, being absorbed thereby, will thus be converted into potential energy. When the tension or pressure of the vapor in the dynamical reservoir falls, the weighted valve G will open the valve F and permit the vapor from the boiler to pass over into the vapor-space of the reservoir, thus automatically regulating the pressure of the vapor in the reservoir and boiler.

I is a pipe coiled in the lower part of the dynamical reservoir and below the surface of the solution contained therein, said pipe being connected at the end $c$ with a cold-water-supply pipe. (Not shown.) The water passes directly to the upper portion of the coil, and then down through said pipe to the outlet $d$. The valve which controls the cold-water supply is connected by means of the rods $a'$ and bell-crank lever $i$ with the valve F in the pipe D, so that when said valve is closed to allow the excess of vapor from the boiler to pass through the pipe E into and below the surface of the liquid in the reservoir the cold-water supply will be automatically turned on, thus reducing the temperature of the liquid in the dynamical reservoir and bringing it to the proper condition to absorb the vapor which enters through the pipe E. It will be noticed that when the required pressure in the dynamical reservoir has been reached the weight G will be raised and the valve $b$ opened. The vapor in excess of that required will be transmitted through the pipe E and converted into potential energy in the dynamical reservoir, no greater pressure than this being possible. If, therefore, a sufficient amount of heat is furnished the boiler, the pressure will remain precisely at the same point for any desired length of time in the dynamical reservoir; and since the tension in the boiler can rise no higher than that in the dynamical reservoir, (communication between them being open,) the tension in the boiler is indirectly controlled by the same act that controls that of the reservoir.

K is a pipe leading from the dynamical reservoir to the cylinder L, said pipe being supplied with a suitable valve, $e$, for controlling the admission of vapor to the cylinder. The cylinder L is surrounded by an outer casing or jacket, L', leaving a space, L'', between the cylinder L and jacket L', the said space being connected with the boiler by means of the pipe N, so that a continuous stream of the weak hot solution from the boiler is forced around the cylinder by boiler-pressure. The heat of this solution imparts to the body of the cylinder the desired working temperature. Having accomplished this purpose in the cylinder, it passes out through the pipe $f$ to a jacketed space, P, surrounding the exhaust-pipe M, and driven forward by boiler-pressure through the pipe N' to the point O' at the top of the reservoir, where it is brought into contact with the exhaust-vapor from the cylinder.

M is an exhaust-pipe leading from the cylinder to the top of the reservoir B, through which the exhaust-vapor from the cylinder is conveyed and brought in contact with the cooled weak solution under boiler-pressure conveyed by the pipe N from the boiler, by which it is carried down through the pipe O into the submerged absorber P, from which the heat generated by absorption is transmitted to the liquid. If by this heat a greater pressure would be produced in the reservoir than required, the pressure automatically opens the valve leading to the cold-water coil, as already indicated, and thus reduces the temperature and pressure to the desired point.

R is a pipe leading from the absorber to the pump S, by which the solution is returned to the boiler above the water-line, and is discharged through a perforated pipe, V, in a fine spray, in order that a large portion of the ammoniacal vapor may be liberated from the solution before it comes in contact with the body of the liquid in the boiler.

When desired, a cooling device of any suitable kind may be introduced between the absorber and pump.

The method of confining the kinetic and potential energy to separate parts of the dynamical reservoir in operation is as follows: Both boiler and reservoir are charged, as heretofore set forth, with a strong solution of aqua-ammonia. Heat being applied to the boiler, the ammoniacal vapor is driven off from it through the kinetic pipe to the dynamical reservoir until a pressure of five or six atmospheres is obtained in the reservoir and boiler. The kinetic valve is now closed and the potential valve opened. The vapor in the boiler will (as soon as the pressure in the reservoir falls a few pounds or that in the boiler rises) be transmitted through the potential pipe and be absorbed in the reservoir. Under this great pressure the liquid will absorb a large amount of vapor. In fact, if the temperature of the liquid is not permitted to rise above 70° Fahrenheit, and the quantity in the reservoir is one-third of that in the boiler, (the strength of the solution not being greater than thirty per centum,) it would absorb and hold in solution a greater amount than the boiler could furnish. It will be observed from the foregoing that by this method the operator can have at will the solution in the boiler as weak, and that in the reservoir as strong, as he may desire. The space occupied by the kinetic or potential vapors is regulated by the amount of fluid in the dynamical reservoir. The relative amount of fluid in the reservoir will at all times depend upon the amount of working-pressure required. If a high pressure is desired, then the amount of liquid in the reservoir relative to that in the boiler will be small; if a low pressure, then a relatively large amount. The reservoir having the proper charge, as soon as the kinetic valve is opened, the ammoniacal vapor rushes into the vapor-space of the reservoir. The surface of the liquid in the reservoir becomes heated by the actual heat of the gases in contact therewith, and by the heat of absorption; but only the surface will become thus heated, for this very heat forms a diaphragm that will not permit the vapors of the upper part to come in contact with the fluid below the surface. The vapor and the liquid are thus separated by this diaphragm, which may be moved up in the reservoir to increase the space occupied by the potential vapors by forcing in liquid under the water-line from the boiler; or it may be moved downward in the reservoir by drawing liquid off from the lower portion of the reservoir and forcing it into the boiler. By this method there is constructed a variable diaphragm for separating the kinetic and potential vapors in the dynamical reservoir.

The operator is enabled at any time to impart kinetic energy alone to the reservoir by closing the potential valve and opening the kinetic valve. This should be done when the engine requires all the energy furnished by the boiler. He is likewise able to transmit potential energy alone by closing the kinetic valve and opening the potential valve, and also the valve to the cold-water coil in the reservoir. This should be done when the pressure is high, or when it is necessary to stop the engine. He can likewise transmit kinetic and potential energy at the same time to the reservoir by partially closing the kinetic valve. This should be done when the energy furnished by the boiler is in excess of that required for the engine, or when it is desirable to weaken the solution in the boiler and strengthen that in the reservoir.

Having thus described my invention, what I claim, and desire to secure by Letters Patent, is—

1. In aqua-ammonia engines, the method of utilizing the heat of absorption, the same consisting in submerging the absorber in the fluid in the reservoir and combining the exhaust-vapor and a cooled weak solution under boiler-pressure before they enter the absorber, so that the heat generated by absorption will superheat the gas in the vapor-space of the reservoir.

2. In aqua-ammonia engines, the method of controlling the temperature of the solution in the dynamical reservoir, the same consisting in the interposition of a cooling agent, as set forth.

3. In aqua-ammonia engines, the method herein described of automatically controlling the pressure of the boiler and dynamical reservoir, the same consisting in diverting the excess of kinetic energy not required for the engine and storing it in the solution within the dynamical reservoir, as set forth.

4. In aqua-ammonia engines, the method herein described of producing a weak solution in the boiler and a strong solution in the reservoir, the same consisting in driving off the ammoniacal vapor from the boiler by the application of heat and converting the same into potential energy by absorption in the dynamical reservoir, as set forth.

5. In aqua-ammonia engines, the method herein described of utilizing the vapors generated, the same consisting in confining one portion of said vapor in the upper part of the dynamical reservoir as kinetic energy, while another portion of the vapor is confined in the lower part of the reservoir by absorption as potential energy, as set forth.

6. In aqua-ammonia engines, the method herein described of utilizing the generated vapors, the same consisting in increasing or diminishing the space occupied in the dynamical reservoir by either the kinetic or potential vapors, as the power required may demand, as set forth.

7. In aqua-ammonia engines, the method herein described of utilizing the vapors generated, the same consisting in transmitting the vapor from the boiler to the dynamical reservoir, either as kinetic or potental energy, or, if desired, as both kinetic and potential energy, as set forth.

8. In aqua-ammonia engines, the method herein described of confining in separate parts of the dynamical reservoir the kinetic and potential vapors, the same consisting of interposing a rising and falling diaphragm formed by the heated surface of the liquid in the reservoir, as set forth.

9. In aqua-ammonia engines, the method herein described of maintaining a proper working temperature in the cylinder, which consists in surrounding the cylinder with a moving body of the hot weak solution from the boiler under boiler-pressure, as set forth.

10. The method herein described of cooling the weak solution from the boiler to restore its absorptive power before being brought in contact with the exhaust-vapor, which consists in passing said solution through a chamber which surrounds the cylinder, whereby the solution gives off an amount of heat equal to that which has disappeared in working the piston, as set forth.

In testimony whereof I affix my signature in presence of two witnesses.

JOSEPH H. CAMPBELL.

Witnesses:
RICHD. C. FELLOWS,
DAN BAILY.